(12) United States Patent
Piché et al.

(10) Patent No.: US 7,092,414 B2
(45) Date of Patent: Aug. 15, 2006

(54) METHOD FOR CHARACTERIZATION OF LASER PULSES USING PULSE QUALITY FACTOR

(75) Inventors: Michel Piché, Cap-Rouge (CA); Guy Rousseau, Québec (CA)

(73) Assignee: Université Laval, Sainte-Foy (CA)

( * ) Notice: Subject to any disclaimer, the term of this patent is extended or adjusted under 35 U.S.C. 154(b) by 508 days.

(21) Appl. No.: 10/429,948

(22) Filed: May 6, 2003

(65) Prior Publication Data

US 2004/0032580 A1    Feb. 19, 2004

(51) Int. Cl.
*H01S 3/10*    (2006.01)
(52) U.S. Cl. .......................................... 372/25; 372/26
(58) Field of Classification Search .................. 372/25
See application file for complete search history.

(56) References Cited

U.S. PATENT DOCUMENTS 4,006,962 A * 2/1977 Olshansky ................... 385/28
6,547,395 B1 * 4/2003 Neal et al. ................... 351/246

OTHER PUBLICATIONS

The Physics and Technology of Laser Resonators, D.R. Hall and P E Jackson, Dept. of Physics, Heriot-Watt University, Edinburg, 1989, pp. 132-143.
Method for Measurement of Realistic Second-Moment Propagation Parameters for Nonideal Laser Beams, by Y. Champagne et al, Optical and Quantum Electronics 27 (1995), pp. 813-824.

* cited by examiner

*Primary Examiner*—Minsun Oh Harvey
*Assistant Examiner*—Dung Nguyen
(74) *Attorney, Agent, or Firm*—Ogilvy Renault LLP

(57) ABSTRACT

There is described a method of characterizing a short laser pulse, the method comprising the steps of obtaining root-mean-square widths of the pulse through second order moments of the pulse; obtaining a spectral width of the pulse using the root-mean-square widths; obtaining a root-mean square temporal width of the pulse; and defining a Pulse Quality Factor proportional to a product of the spectral width and the temporal width. This approach does not require complete characterization of laser pulses and eliminates the need of any assumption to interpret autocorrelation traces. The method can be applied to pulses of arbitrary shape.

17 Claims, 4 Drawing Sheets

METHOD FOR CHARACTERIZATION OF LASER PULSES USING PULSE QUALITY FACTOR

FIELD OF THE INVENTION

The invention relates to characterizing laser pulses. More specifically, it relates to characterizing short laser pulses without subjective interpretations of autocorrelation traces and irrespective of the pulse shape.

BACKGROUND OF THE INVENTION

Mode-locked lasers are now capable of generating pulses whose duration can be as short as a few femtoseconds (one femtosecond=$10^{-15}$ sec.). There is a broad variety of mode-locked lasers emitting pulses from nanosecond (one nanosecond=$10^{-9}$ sec.) to femtosecond duration. Short laser pulses can be amplified in laser amplifiers; they can also be temporally compressed externally to laser systems using the combination of spectral broadening in a nonlinear medium, and propagation in a dispersive material. The peak power of the pulses emitted by ultra-fast laser systems can be as low as one watt in mode-locked semiconductor diodes, and can reach the petawatt range (one petawatt=$10^{15}$ watts) in the highest power systems.

Pulses of laser radiation need to be characterized in both the spectral and temporal domains. The full characterization of pulses would require knowing the pulse intensity and phase in at least one domain (the pulse distribution in the other domain would be given by a Fourier transform). In practice, it turns out that phase information is difficult to obtain, but the intensity information is accessible through the measurements done with various instruments. Phase information, though, is crucial for pulse characterization; it defines the frequency chirp (the drift of laser frequency during the short pulse). Frequency and phase are interrelated; frequency is the derivative of the phase. The phase distribution of a pulse contributes to define the pulse duration; when the phase of a laser pulse is constant throughout the pulse, it is then that the pulse duration is minimum.

In the spectral domain, one uses various types of optical spectrometers (usually grating spectrometers) to obtain directly the power spectral density of the laser pulses, In the time domain, one does not have detectors fast enough to directly monitor the pulse shape, if the pulse duration is below 10 picoseconds (one picosecond=$10^{-12}$ sec.). This situation is due to the fact that electronic detectors, in combination with sampling oscilloscopes, can measure optical signals of duration down to 10 picoseconds; this approach does not allow to go much below that limit. There is one exceptionally fast detector, that allows to record the direct pulse shape: it is the streak camera. However this detector is a very expensive instrument (cost>$300,000) that has a limited response time (slightly under one picosecond) and that has a limited sensitivity in the near-infrared, the spectral range used for optical telecommunications.

The limitations of conventional electronic detection systems have forced the users of ultra-fast lasers to investigate indirect methods based on nonlinear optics to obtain information about the pulse shape. In general, for temporal measurements down to the femtosecond range, one uses autocorrelators. These instruments take advantage of an optical non-linearity (second-harmonic generation, two-photon absorption) to produce the correlation of the pulse intensity with itself. Typical autocorrelator setups involve splitting a pulse into two replicas with a variable delay (for instance, with a Michelson interferometer); the two pulses travel in parallel but do not overlap spatially. The pulses are focused in the nonlinear material. The autocorrelation signal is obtained from the second harmonic signal or the photo-current generated by two-photon absorption.

Autocorrelators are found in every laboratory involved with short pulse lasers. Despite their general use, autocorrelators have a number of drawbacks, the most important being that they do not provide access to the real pulse shape, but to its intensity autocorrelation. The data obtained with autocorrelators can be fitted with various pulse shapes; in practice one cannot discriminate between different pulse shapes. Their use has some practical relevance (easy implementation, commercial availability of autocorrelators) but the information they produce is incomplete. Qualitative information about frequency chirp can be obtained using what is called interferometric autocorrelation; the difference between conventional (intensity) autocorrelation and interferometric autocorrelation is that the two replicas of the pulse under study travel on parallel, distinct axes in the first type of autocorrelators, and travel along the same axis for the second type.

The most often quoted parameter describing short laser pulses is their duration. One generally defines pulse duration as the Full Width at Half Maximum (FWHM) of the pulse intensity distribution in the time domain. This definition of pulse duration leads to some arbitrariness, especially if there are pedestals before or after the pulse, or if the pulse shape is not smooth but exhibits some bumps. For such pulse shapes the duration defined in terms of FWHM is not representative of the entire pulse shape. It should be pointed out that autocorrelation measurements do not provide a direct reading of the pulse FWHM, unless autocorrelation data are fitted with a certain function representative of the pulse shape. But again this procedure leads to arbitrariness in the choice of the fitting function.

In the spectral domain, the pulses are often characterized by their spectral width defined as the FWHM of the power spectral density of the pulses (to shorten the notation we will use "pulse spectrum" as a short hand for "power spectral density of pulses"). Optical spectrometers allow to record directly the pulse spectrum; hence the estimation of the FWHM in the spectral domain does not involve any data fitting with a selected functional form (as for the case of temporal measurements with autocorrelators). Still the relevance of the FWHM can be questioned whenever the pulse spectrum exhibits pedestals or multiple peaks.

It has become a common practice to quote the time-bandwidth product of a pulse. The time-bandwidth product is given by the product of the pulse FWHM's in the time and spectral domains. For a given pulse shape, this parameter assumes a minimum value when the pulse phase is constant (no frequency chirp). The problem with the use of that parameter is that temporal measurements made with autocorrelators are indirect, hence one never knows if the assumed pulse shape is really representative of the true pulse shape.

Advanced diagnostics have recently been developed to remove the arbitrariness behind the interpretation of autocorrelation measurements. The two most quoted methods are labeled FROG (Frequency Resolved Optical Gating) and SPIDER (Spectral Phase Interferometry for Direct Electric field Reconstruction.). These two methods are somewhat more complex than conventional autocorrelators. The interpretation of FROG (D. J. Kane and R. Trebino, IEEE J. Quantum Electron. 29, 571 (1993)) measurements necessitates a complex inversion algorithm; the interpretation of SPIDER (C. Iaconis and I. A. Walmsley, Opt. Lett. 23, 792 (1998)) measurements does not require such a complex numerical procedure, but the experimental implementation of SPIDER involves splitting the pulse under study into three replicas, one of which would be stretched in time due to an imposed frequency chirp.

Even though these two diagnostics provide a full characterization of laser pulses (at least, in principle), they do not provide any guideline as to how the pulses are going to be modified when they travel through a dispersive material. Any transparent material (various dielectrics such as glass, optical fibers, optical waveguide, etc . . . ) has an index of refraction that changes with optical wavelength (or frequency); this phenomenon is called dispersion. Dispersion has profound effects on the shape of laser pulses propagated in dielectric materials; since the different spectral components (or frequencies) constituting the pulses are traveling at different speeds. Dispersion leads to pulse stretching for input pulses with no chirp. Dispersion can lead to pulse compression if the input pulse possesses a certain chirp, and the dispersive material has a dispersion such that it produces a chirp of opposite sign. To predict how the shape of pulse evolves in a dielectric, one needs to use a numerical algorithm to simulate pulse propagation. Only in exceptional cases, such as Gaussian pulses, one can rely on a purely analytical approach to predict the changes of the pulse parameters; in general, however, this is not possible.

SUMMARY OF THE INVENTION

Accordingly, an object of the present invention is to provide an analytical approach to the description of the properties of laser pulses when they are propagated in dispersive media.

Another object of the invention is to define a Pulse Quality Factor using rms widths in the time and frequency domains.

Yet another object of the invention is to determine a propagation law for pulse rms width in the time domain using the Pulse Quality Factor.

According to a first broad aspect of the present invention, there is provided a method for characterizing a pulse comprising: obtaining a root-mean-square (RMS) spectral widths of the pulse through first and second order moments of the pulse intensity distribution in the spectral domain; obtaining an RMS minimum temporal width of the pulse through first and second order moments of the pulse intensity distribution in the time domain; and defining a Pulse Quality Factor proportional to a product of the spectral width and temporal width.

Preferably, the Pulse Quality Factor is defined as $P^2 = 4\pi\sigma_\nu\sigma_{t,min}$. The second-order moments are evaluated as a function of the tractional power FP, $\sigma_\nu$ is the rms width of the pulse spectrum, and $\sigma_{t,min}$ is the minimum value of the rms temporal width of the pulse.

According to a second broad aspect of the present invention, there is provided method to predict analytically the evolution of a pulse temporal width as it propagates in a dielectric media causing a second-order dispersion, the method comprising: obtaining a root-mean-square spectral width of the pulse through first and second order moments of a pulse intensity distribution in a spectral domain; obtaining a root-mean-square minimum temporal width of the pulse through first and second order moments of the pulse intensity distribution in a time domain; calculating a Pulse Quality Factor parameter proportional to a product of the spectral width and the temporal width; calculating a generalized dispersion length parameter using the pulse quality factor parameter, the root-mean-square minimum temporal width, and a second order dispersion coefficient that characterizes the dielectric media; establishing a relationship between the temporal width of the pulse and a ratio of the propagation length in the dispersion media to the generalized dispersion length parameter, and predicting the pulse temporal width with respect to a pulse position in the media using said relationship.

For the purpose of the present invention, the following terms are defined below. They are definitions of standard quantities that will be used in the detailed description of the invention.

a) Pair of Fourier Transforms.

Let us consider an optical signal whose complex field amplitude in the time domain is given by $\tilde{f}(t)$. Its associated Fourier Transform $\tilde{F}(v)$ is defined as:

$$\tilde{F}(v) = \int_{-\infty}^{+\infty} \tilde{f}(t)e^{-j2\pi vt}dt, \quad (1)$$

where v is the frequency. $\tilde{F}(v)$ is the complex field amplitude in the frequency domain.

One can obtain $\tilde{f}(t)$ from the inverse Fourier Transform of $\tilde{F}(v)$ according to:

$$\tilde{f}(t) = \int_{-\infty}^{+\infty} \tilde{F}(v)e^{+j2\pi vt}dv. \quad (2)$$

It should be noted that both $\tilde{f}(t)$ and $\tilde{F}(v)$ are complex functions. They contain information on amplitude and phase of the signal. The instantaneous power of the signal is given by:

$$p(t)=|\tilde{f}(t)|^2 \quad (3)$$

and its power spectral density is defined as $$P(v)=|\tilde{F}(v)|^2. \quad (4)$$

The function p(t) represents the pulse shape in the time domain, and P(v) the pulse spectrum. P(v) can be measured with an optical spectrometer. In principle p(t) is measured with quadratic detectors (such as p-i-n or avalanche photodiodes or photomultipliers); however, for very short laser pulses, such detectors are not fast enough. Under such circumstances one often measures the autocorrelation $I_{ac}(t)$ of the pulse intensity, defined as:

$$I_{ac}(t) = \int_{-\infty}^{\infty} p(\tau)p(t+\tau)d\tau \quad (5)$$

b) Definition of rms Widths

The rms width $\sigma_t$ of a signal is defined as:

$$\sigma_t^2 = \int_{-\infty}^{+\infty}(t-\bar{t})^2 p(t)dt \bigg/ \int_{-\infty}^{+\infty} p(t)dt \quad (6)$$

$$\bar{t} = \int_{-\infty}^{+\infty} tp(t)dt \bigg/ \int_{-\infty}^{+\infty} p(t)dt \quad (7)$$

where p(t) is the power of the signal (e.g. it is the pulse shape). In the spectral domain, one can define equivalent quantities according to:

$$\sigma_v^2 = \int_{-\infty}^{+\infty} (v - \bar{v})^2 P(v) dv \bigg/ \int_{-\infty}^{+\infty} P(v) dv \qquad (8)$$

$$\bar{v} = \int_{-\infty}^{+\infty} v P(v) dv \bigg/ \int_{-\infty}^{+\infty} P(v) dv \qquad (9)$$

where $P(v)$ is the spectral power density of the signal (e.g. its spectrum) and $\sigma_v$ its rms width in the frequency (or spectral) domain.

For a real (unchirped) Gaussian signal, one can show that the product of the rms widths in the time and frequency domains is given by:

$$\sigma_t \sigma_v = \frac{1}{4\pi} \qquad (10)$$

The product $\sigma_t \sigma_v$ is minimum for that function. For any other signal one has:

$$\sigma_t \sigma_v \geq \frac{1}{4\pi} \qquad (11)$$

The rms width $\sigma_{t,ac}$ of the signal autocorrelation defined at Eq. (5) is related to the rms width $\sigma_t$ according to:

$$\sigma_{t,ac}^2 = 2\sigma_t^2 \qquad (12)$$

This relationship has some practical relevance since it allows to evaluate the rms width of a signal without requiring the knowledge of its temporal shape p(t), but its autocorrelation $I_{ac}(t)$. The latter function is accessible to measurements with standard diagnostics (autocorrelators) in laboratories involved with ultra-fast lasers.

BRIEF DESCRIPTION OF THE DRAWINGS

These and other features, aspects and advantages of the present invention will become better understood with regard to the following description and accompanying drawings wherein.

DETAILED DESCRIPTION OF THE PREFERRED EMBODIMENT

Figure 1:
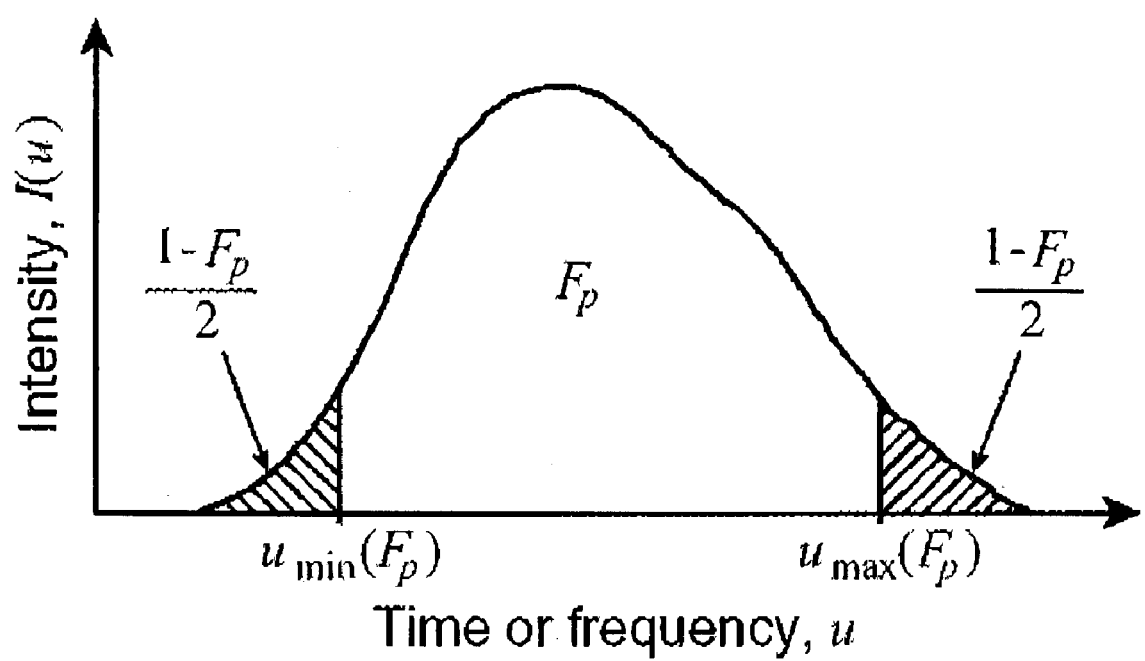
FIG. 1 is the normalized intensity distribution I(u)

It is well known that linear pulse propagation in dispersive media is formally equivalent to beam propagation in free space [S. A. Akhmanov, V. A. Vysloukh, and A. S. Chirkin, "Optics of Femtosecond Laser Pulses", American Institute of Physics, New York, 1992.]. Using this analogy, one can recast in the temporal domain (pulse propagation) many useful concepts first developed in the spatial domain (beam propagation). Such an analogy, however, is valid only for situations where second-order dispersion (GVD) is the dominant pulse modification process, e.g. when higher-order dispersion and nonlinear processes lead to negligible effects on the pulse shape. Based on these considerations, the Pulse Quality Factor or $P^2$ parameter is defined by:

$$P^2 = 4\pi \sigma_v \sigma_{t,min} \qquad (1)$$

where $\sigma_v = \sqrt{\langle v^2 \rangle - \langle v \rangle^2}$ and $\sigma_{t,min} = \sqrt{\langle t^2 \rangle - \langle t \rangle^2}$ are the rms-widths. These rms-widths are related to the first- and second-order moments of their respective intensity distributions $I(t)$ and $I(v)$ with the usual relationship:

$$\langle u^n \rangle = \int_{-\infty}^{+\infty} u^n I(u) du \bigg/ \int_{-\infty}^{+\infty} I(u) du \qquad (2)$$

where u stands either for time or frequency. These quantities can be reliably evaluated using the Fractional Power concept, as described later in this paper. Using the Schwarz inequality, one can show that the minimal value of the temporal rms-width $\sigma_{t,min}$ is obtained when the phase function in the spectral domain has a linear dependence upon optical frequency. Thus $\sigma_{t,min}$ min can be calculated from the Fourier transform of the pulse spectrum. Hence the $P^2$ parameter can be estimated purely from spectral measurements.

When second-order dispersion (GVD) is the leading mechanism responsible for the changes in pulse duration, the temporal rms-width evolves along the z-axis according to the following propagation law:

$$\frac{\sigma_t(z)}{\sigma_{t,min}} = \left[1 + \left(\frac{z}{L_D}\right)^2\right]^{1/2} \qquad (3)$$

$L_D$ is the generalized dispersion length (in cm) which is inversely proportional to the Pulse Quality Factor:

$$L_D \equiv \frac{1}{P^2} \cdot \frac{2\sigma_{t,min}^2}{|\beta_2|} = \frac{1}{2\pi |\beta_2|} \frac{\sigma_{t,min}}{\sigma_v} \qquad (4)$$

where $\beta_2$ is the second-order dispersion coefficient (in fs²/cm). Again, by analogy with beam propagation, Gaussian pulses should be called "dispersion limited" pulses.

In ultra-fast optics, we generally do not have direct access to the real pulse shape $I(t)$, but rather to its intensity autocorrelation $I_{ac}(t)$;

$$I_{ac}(t) = \int_{-\infty}^{\infty} I(t + \tau) I(\tau) d\tau \qquad (5)$$

The addition law of variances under convolution, well-known in Fourier analysis [R. N. Bracewell, "The Fourier Transform and Its Applications", Second Edition, McGraw-Hill, Inc., New York, 1986.], implies the following relationship between the variances of $I(t)$ and $I_{ac}(t)$:

$$\sigma_{t,ac}^2 = 2\sigma_t^2 \qquad (6)$$

This simple relationship is independent of the pulse shape and phase profile. Hence we can measure the Pulse Quality Factor $P^2$ according to:

$$P^2 = 4\pi\sigma_\nu \sigma_{t,min} = 2\sqrt{2}\pi\sigma_\nu (\sigma_{t,ac})_{min} \quad (7)$$

where $\sigma_\nu$ is the rms-width of the pulse power spectrum and $(\sigma_{t,ac})_{min}$ is the minimum value of the rms-width of the pulse intensity autocorrelation.

The fractional power $F_p$ of a normalized intensity distribution $I(u)$ is defined as follows [Y. Champagne and P.-A. Bélanger, Opt. and Quantum Electron., 27, 813 (1995).]:

$$\int_{-\infty}^{u_{min}(F_p)} I(u)du = \frac{1-F_p}{2} = \int_{u_{max}(F_p)}^{+\infty} I(u)du \quad (8)$$

Eq. (8) is illustrated in FIG. 1 where we see that the value of $F_p$ determines uniquely abscissa values $u_{min}$ and $u_{max}$ which limit the domain of abscissa considered. The rejected areas (hatched on the graph) are evenly distributed on each side of the distribution. The rejection of these areas eliminates the main source of error due to the noise on each side of the distribution. This noise becomes excessively important when multiplied by $u^2$ in the evaluation of the second-order moment. To determine the second-order moment, one must first evaluate it as a function of the fractional power $F_p$ defined by Eq. (8).

Figure 2:
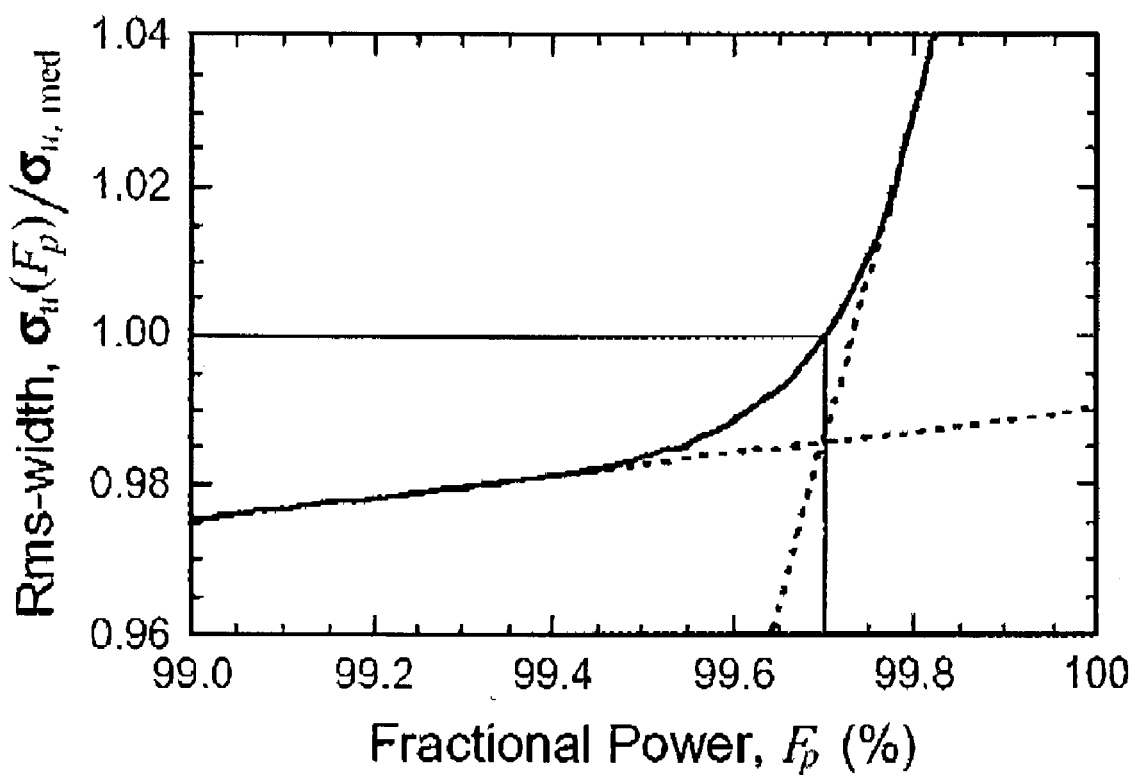
FIG. 2 is a scheme to determine the median value $\sigma_{u,med}$ of an rms-width.

This procedure generally leads to a graph as shown in FIG. 2. The best value of the fractional power $F_p$ is then chosen to be at the intersection of the two asymptotic lines. The width of the transition between these asymptotic lines can also be used to estimate the experimental error on the median value of the rms-width, $\sigma_{u,med}$. In this type of analysis, the noise is used to determine the uncertainty on the measurement. We have found that, for good quality autocorrelation traces, the rejected areas of the intensity autocorrelation trace are often less than 0.1% of the total area. This procedure is not limited to intensity autocorrelation traces but could also be used for interferometric autocorrelation traces [E. Sorokin, G. Tempea, and T. Brabec, J. Opt. Soc. Am. B, 17, 146 (2000).].

We have tested these ideas with the femtosecond pulses from a prism-controlled Kerr-lens-mode-locked (KLM) Ti:sapphire laser. After exiting the laser, the pulses go through a sequence of fused silica prisms to produce a slightly negative frequency chirp. The pulses are characterized with a two-photon absorption (TPA) dispersion compensated autocorrelator and a miniature spectrometer.

Figure 3:
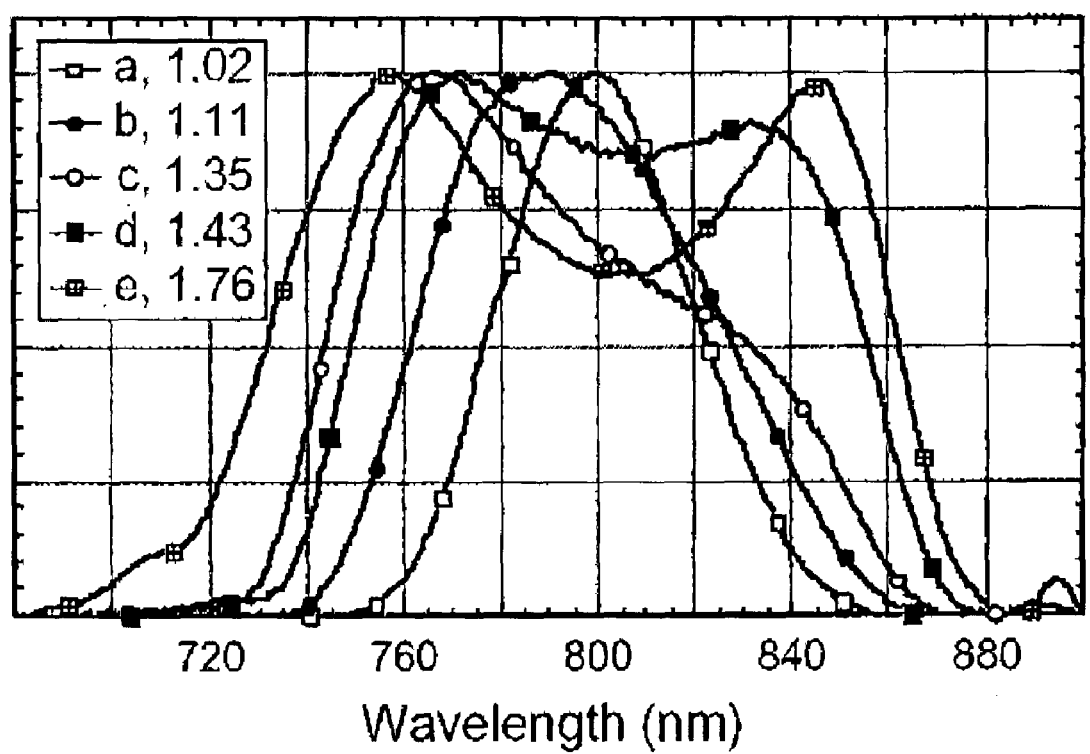
FIG. 3 is the power spectra of the femtosecond pulses used in the experiment.

To verify the applicability of the Pulse Quality Factor $P^2$, we have studied the evolution of the rms-duration of pulses propagating in fused silica and compared the results with those predicted by the propagation law stated before. Pulses having different spectral shapes have been used. The pulse spectra are shown in FIG. 3. Note that some of these spectra differ significantly from the usual Gaussian or hyperbolic secant spectra that are often used to interpret autocorrelation data.

Figure 4:
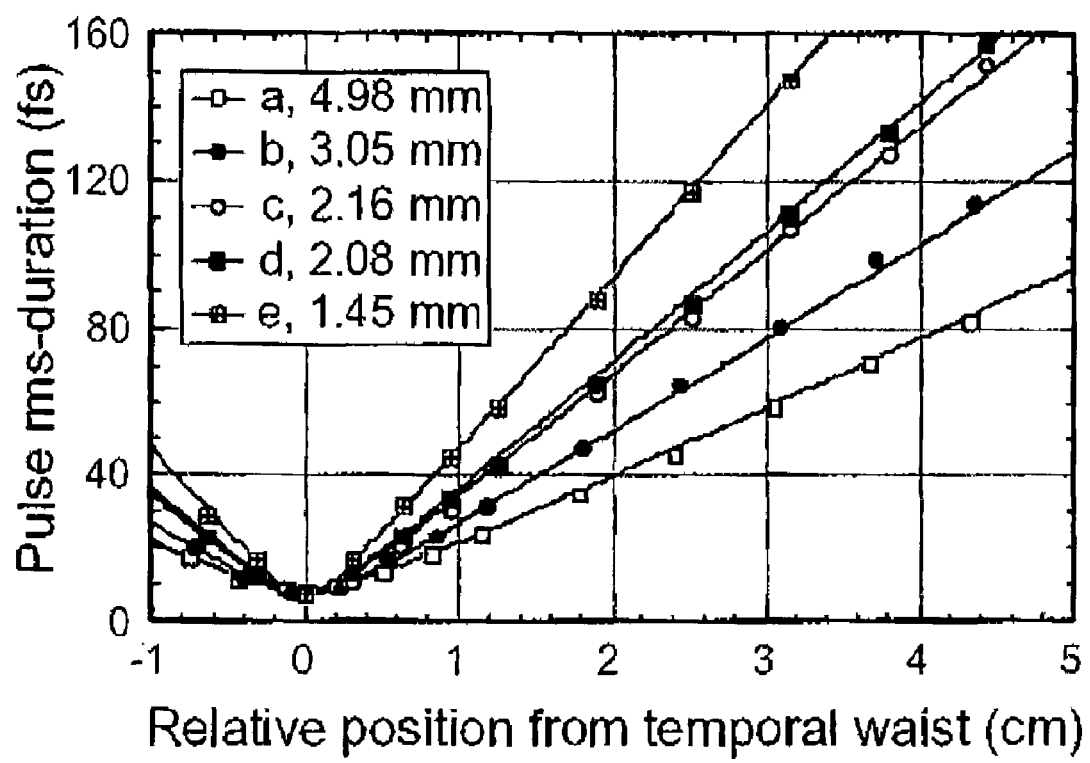
FIG. 4 is a comparison of the propagation law with the measured rms-duration for each spectrum shown in FIG. 3.

We have analyzed the measured power spectra and their Fourier transforms to evaluate the $P^2$ parameter. We have plotted the propagation law (continuous lines) for each pulse in FIG. 4. In the same graph, we have plotted rms-duration deduced from measured interferometric autocorrelation traces with the help of the Fractional Power concept. The agreement between theory and experiment is quite convincing even for pulses having an asymmetric or a non-Gaussian spectrum.

In summary, we have introduced the definition a Pulse Quality Factor to remove "pulse shape dependent" interpretations of autocorrelation traces. The $P^2$ parameter has a direct physical interpretation and is a measurable quantity with widespread measurement techniques. As a demonstration of its applicability, we have experimentally investigated the evolution of the temporal rms-width of femtosecond laser pulses propagating in bulk fused silica. The agreement between the measured temporal rms-widths and those predicted with the propagation law using explicitly the Pulse Quality Factor is excellent. Rms-widths should become more widely applied in experimental ultra-fast optics. The evaluation of rms-widths from experimental or numerical data was performed using the Fractional Power concept in order to alleviate the sensitivity to noise.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

The invention claimed is:

1. A method for characterizing a pulse, the method comprising: obtaining a root-mean-square widths of the pulse through first and second order moments of the pulse intensity distribution in the spectral domain;
   obtaining a root-mean square minimum temporal width of the pulse through first and second order moments of the pulse intensity distribution in time domain; and
   defining a Pulse Quality Factor parameter proportional to a product of the spectral width and the temporal width.

2. A method as claimed in claim 1, wherein said pulse is a short laser pulse in ultrafast optics.

3. A method as claimed in claim 1, wherein said obtaining a root-mean-square widths comprises using a fractional power concept to decrease uncertainties on root-mean-square values extracted from experimental noisy distribution data by rejecting areas evenly distributed on each side of said distribution and by evaluating a second-order moment of said distribution on a non-rejected area of said distribution.

4. A method as claimed in claim 1, wherein said obtaining a root-mean-square minimum temporal width of the pulse comprises using data from autocorrelation measurements of said pulse intensity distribution.

5. A method as claimed in claim 1, wherein said obtaining a root-mean-square temporal minimum width of the pulse comprises assuming all frequencies are in phase and computing numerically a Fourier transform of the pulse intensity distribution in a spectral domain.

6. A method as claimed in claim 1, wherein said defining a Pulse Quality Factor comprises normalizing said product of the spectral width and the temporal width to a result obtained for an unchirped Gaussian pulse.

7. A method as claimed in claim 4, wherein said autocorrelation measurements of the pulse intensity distribution comprise experimental data obtained with an autocorrelator based on second harmonic signal generation.

8. A method as claimed in claim 1, wherein said obtaining a root-mean-square minimum temporal widths of the pulse comprises using streak cameras measurements of the pulse intensity.

9. A method to predict analytically the evolution of a pulse temporal width as it propagates in a dielectric media causing a second-order dispersion, the method comprising:
   obtaining a root-mean-square spectral width of the pulse through first and second order moments of a pulse intensity distribution in a spectral domain;
   obtaining a root-mean-square minimum temporal width of the pulse through first and second order moments of the pulse intensity distribution in a time domain; calculating a Pulse Quality Factor parameter proportional to a product of the spectral width and the temporal width;
   calculating a generalized dispersion length parameter using the pulse quality factor parameter, the root-mean-square minimum temporal width, and a second order dispersion coefficient that characterizes the dielectric media;
   establishing a relationship between the temporal width of the pulse and a ratio of the propagation length in the dispersion media to the generalized dispersion length parameter; and
   predicting the pulse temporal width with respect to a pulse position in the media using said relationship.

10. The method as claimed in claim 9, wherein said dielectric media comprises fused silica.

11. A method as claimed in claim 9, wherein said pulse is a short laser pulse in ultrafast optics.

12. A method as claimed in claim 9, wherein said obtaining a root-mean-square width comprises using a fractional power concept to decrease uncertainties on root-mean-square values extracted from experimental noisy distribution data by rejecting areas evenly distributed on each side of said distribution and by evaluating a second-order moment of said distribution on a non-rejected area of said distribution.

13. A method as claimed in claim 9, wherein said obtaining a root-mean-square minimum temporal width of the pulse comprises using data from autocorrelation measurements of said pulse intensity distribution.

14. A method as claimed in claim 9, wherein said obtaining a root-mean-square temporal minimum width of the pulse comprises using data obtained from a Fourier transform of said pulse intensity distribution in a spectral domain by assuming all frequencies are in phase.

15. A method as claimed in claim 9, wherein said calculating a Pulse Quality Factor comprises normalizing said product of the spectral width and the temporal width to a result obtained for an unchirped Gaussian pulse.

16. A method as claimed in claim 13, wherein said autocorrelation measurements of the pulse intensity distribution comprise experimental data obtained with an autocorrelator based on second harmonic signal generation.

17. A method as claimed in claim 9, wherein said obtaining a root-mean-square minimum temporal width of the pulse comprises using streak camera measurements of the pulse intensity.

* * * * *